Nov. 16, 1965   F. K. H. NALLINGER   3,218,055
PNEUMATIC SPRING SYSTEM
Filed Dec. 6, 1962
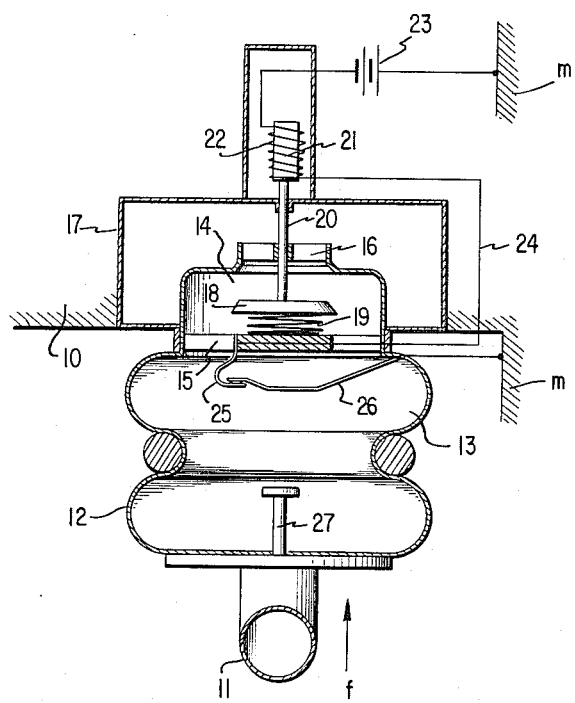
INVENTOR.
FRIEDRICH K. H. NALLINGER
BY Dicke & Craig
ATTORNEYS

United States Patent Office 3,218,055
Patented Nov. 16, 1965

3,218,055
PNEUMATIC SPRING SYSTEM
Friedrich K. H. Nallinger, Stuttgart, Germany assignor to Daimler-Benz Aktiengesellschaft, Stuttgart-Unterturkheim, Germany
Filed Dec. 6, 1962, Ser. No. 242,692
Claims priority, application Germany,
Dec. 9, 1961, D 37,634
3 Claims. (Cl. 267—65)

The present invention relates to a pneumatic spring system for vehicles, especially motor vehicles, provided with an air volume additional to the air volume of the pneumatic spring member, for example, of a spring bellows, which additional air volume is subdivided into two additional air spaces adapted to be closed off from one another of which the first is permanently in communication with the air volume of the pneumatic spring member and is adapted to be closed off with respect to the second additional air space or auxiliary pneumatic space.

Known in the prior art is a pneumatic spring system for vehicles in which the inside of a pneumatic spring bellows is connected with two additional air spaces connected in series one behind the other. The additional air space more remote from the pneumatic spring bellows is thereby adapted to be closed off with respect to the additional air space closer to and permanently connected with the spring bellows by means of a control member actuated in dependence on the distance of the vehicle parts to be mutually spring-supported so that a progressive spring action is achieved thereby. The two additional air spaces of the prior art system have thereby the same size. The characteristics of such a spring system, however, entails the disadvantage that by reason of the relatively large additional air volume which also remains connected with the inside of the pneumatic spring bellows at the end of the spring stroke, a relatively soft spring deflection is permitted with a damping action that may be insufficient under certain circumstances, and therefore the danger exists that the vehicle parts which are mutually spring supported hit or abut against one another in response to strong shocks or impacts and may thereby result in damages or destructions to these vehicle parts.

Additionally, in the known prior art installation, the closing of the rearward additional air space takes place in a continuous manner in dependence on the stroke of the vehicle axle so that a gradual throttling of the connection precedes the complete closing thereof.

The present invention avoids these disadvantages and essentially consists in dimensioning the first additional air space which remains permanently connected with the air volume of the pneumatic spring member, especially of the spring bellows, very small in comparison to the auxiliary air space adapted to be closed off with respect thereto or with respect to the air volume of the pneumatic spring member and by actuating a closure member adapted to close the second additional air space in dependence on the spring stroke of a vehicle axle or of an individual wheel only within the end zone of this stroke.

There is achieved by the present inveniton the advantage that with a relatively rapid closing of the larger additional air space adapted to be closed, that is with a relatively rapid closing taking place only over a relatively short partial stroke of the wheel spring system, the volume of the smaller additional air space remaining in communication with the inside of the pneumatic spring member assures a relatively hard spring action at the instant of closing by reason of the fact that this small additional air space acts practically, for example, like a well-dimensioned rubber cushion or elastic buffer. As a result thereof it is possible to prevent, regardless of the frequency and amplitude of the spring deflections, the axle from abutting or hitting against the vehicle superstructure.

Preferably, the actuation of the closure member takes place in a sudden snap-like manner. However, the closure member may also be controlled by an auxiliary force, for example, by an electric, pneumatic or hydraulic auxiliary force. Possibly, a snap-action or toggle-like mechanism may be provided which brings the closure member almost instantaneously into the closure position thereof when a predetermined spring stroke is reached. The return adjustment or opening of the closure member may take place at the same place of the spring stroke or also only again at a lower place of the spring stroke than the closure thereof.

Accordingly, it is an object of the present invention to provide a pneumatic spring system for motor vehicles which eliminates, by simple means, the shortcomings and disadvantages encountered with the prior art constructions.

Another object of the present invention resides in the provision of a pneumatic spring system for vehicles, particularly motor vehicles in which auxiliary air spaces are coordinated to the air space formed by the pneumatic spring member which are so constructed and arranged as to provide favorable spring characteristics under all operating conditions.

A further object of the present invention resides in the provision of a pneumatic spring system for vehicles provided with a pneumatic spring member and auxiliary air spaces coordinated thereto in which an excessively soft spring action with an insufficient damping effect is prevented, particularly toward the end of the spring stroke.

Still another object of the present invention resides in the provision of a pneumatic spring system in which is eliminated the danger of damage or destructive wear to the parts of the spring system or of the vehicle connected thereto that may result from sudden large spring deflections otherwise causing the parts to be mutually spring-supported to hit or abut against one another.

A further object of the present invention resides in the provision of a pneumatic spring system in which a relatively sudden closure of the auxiliary air space is feasible without the necessity of a gradual throttling of the connection preceding the total closure thereof.

Still a further object of the present invention resides in the provision of a pneumatic spring system provided with an auxiliary air space coordinated to the pneumatic spring member in which closure of the auxiliary air space takes place only toward the end of the spring stroke.

Another object of the present invention resides in the provision of a pneumatic spring system which permits the realization of a relatively hard spring characteristic so that excessive spring deflections are avoided independently of the frequency of recurrence thereof.

These and other objects, features and advantages of the present invention will become more obvious from the following description when taken in connection with the accompanying drawing which shows in the single figure thereof, for purposes of illustration only, one embodiment in accordance with the present invention.

Referring now to the single figure of the drawing which illustrates schematically one embodiment of a pneumatic spring system in accordance with the present invention provided with an electric control of the closure valve, reference numeral 10 designates therein the vehicle superstructure, such as the vehicle frame or body of a self-supporting type body construction while reference numeral 11 designates a vehicle axle forming part of an axle or independent wheel suspension and reference numeral 12 a spring bellows serving as pneumatic spring member. The lower end of the spring bellows 12 is operatively connected with the axle 11 and the upper end thereof with the vehicle superstructure 10.

A relatively smaller additional air space 14 is connected with the interior 13 of the pneumatic spring member 12 by way of apertures 15 which are as wide as possible. The additional air space 14 is also in communication by way of further apertures 16 with a relatively larger pneumatic spring space 17 arranged either offset with respect thereto or concentric with respect thereto as illustrated herein. The aperture 16 is adapted to be closed by means of a closure valve 18. The closure valve 18, on the one hand, is subjected to the action of a spring 19 which seeks to urge the valve into the closure position thereof and, on the other, carries at the other, for example, upper end of the valve shaft 20 an armature 21 which is surrounded by a solenoid coil 22. The coil 22 is connected at one end thereof with an electric source of power 23 and by way of the latter, for example, with the ground m of the vehicle superstructure 10. The other end of the coil 22 leads by way of a line 24 to a contact 25 which cooperates with a spring contact 26 also connected to ground m.

An abutment 27 is arranged at the axle 11 or at the lower support member of the pneumatic spring bellows 12, or at any other suitable place, in the illustrated embodiment on the inside of the pneumatic spring bellows 12, which abutment 27 abuts during spring deflections of the axle 11 in the direction of arrow f, after a predetermined stroke, against the spring contact 26 and thereby interrupts the contact connection between the two contact elements 25 and 26.

Whereas in the illustrated position the contact elements 25 and 26 close the current circuit for the current flowing through the coil 22 and thereby retain the closure valve 18 in the lower open position thereof, upon opening of the contact connection between the contact elements 25 and 26 the electromagnetic force maintaining the closure valve 18 in the open position as illustrated in the drawing is removed so that the closure valve 18 is returned in a sudden almost instantaneous manner into the closure position thereof under the effect of the spring 19.

The initially very soft spring system thereby receives at the end of the spring stroke a relatively hard spring characteristic since only the additional air space 14 remains available for compression of the enclosed air. The air space 14 which is relatively very small in comparison with the additional air space 17 acts accordingly substantially as rubber cushion or rubber buffer which dampens with corresponding stiffness the spring movement of the axle 11 near the end of the spring stroke thereof and therewith prevents an abutment of the mutually spring-supported parts with respect to each other.

If the axle 11 again returns into the lower position thereof relative to the vehicle superstructure 10, then the closure valve 18 is again drawn by the coil 22 into the illustrated lower position so that again the entire additional air space consisting of both partial air spaces 14 and 17 is available for the spring system.

Possibly, the valve 18 may, in lieu of the indirect actuation thereof by the electric current or any other suitable auxiliary force, be actuated directly by means of any conventional snap-type or toggle-like switch so that a particularly sudden snap-like adjustment of the valve or of an analogous closure member is achieved.

While I have shown and described one embodiment in accordance with the present invention it is understood that the same is not limited thereto but is susceptible of numerous changes and modifications within the spirit and scope thereof as known to a person skilled in the art, the drawing herein merely illustrating purely schematically the present invention. The additional air volume 14 may also possibly be dimensioned considerably smaller than illustrated in the drawing in order to effect a very rapid damping of the spring movement at the end of the spring stroke. Under certain conditions, the additional air volume 14 may also be reduced to zero so that only the residual volume remaining in the pneumatic spring member at the end of the spring stroke remains effective as buffer or cushion.

Thus, it is obvious that the present invention is not limited to the details shown and described herein but is susceptible without departing from the spirit and scope thereof, of numerous changes and modifications and I therefore do not wish to be limited to these details but intend to cover all such changes and modifications as are encompassed by the scope of the appended claims.

I claim:

1. A pneumatic spring system for vehicles, especially motor vehicles, mounted between an axle system and a spring-suspended part of the vehicle, comprising pneumatic spring means including a resiliently workable hollow piece enclosing a first part of a compressed air volume, whereby said first part of said compressed air volume undergoes continuous changes in size due to the working of the hollow piece in response to the spring induced travel between the axle system and the spring-suspended part of the vehicle, at least one chamber enclosing a second part of said compressed air volume and being connected with said first part by a linking aperture, valve type shut-off means suitable for sealing said linking aperture, spring means normally brasing said shut-off means into sealing contact with said linking aperture, and normally actuated means operatively associated with the shut-off means, mounted between the axle system and the spring-suspended part, for normally counteracting the effect of said spring means to maintain said shut-off means out of contact with said linking aperture, and control means only during last portion of spring-induced travel for deactivating said normally actuated means to allow said shut-off means to seal said linking aperture whereby during final spring-induced travel only the pressure of said first part of said compressed air volume will change.

2. A pneumatic spring system for vehicles, especially motor vehicles, mounted between an axle system and a spring suspended part of the vehicle, comprising pneumatic spring means including a resiliently workable hollow piece enclosing a first part of a compressed air volume, whereby said first part of said compressed air volume undergoes continuous changes in size due to the working of the hollow piece in response to the spring-induced travel between the axle system and the spring suspended part of the vehicle, at least one chamber enclosing a second part of said compressed air volume and being connected with said first part by a linking aperture, valve-type shut-off means suitable for sealing said linking aperture, and actuating means operatively associated with the shut-off means, mounted between the axle system and the spring-suspended part, for actuating said shut-off means to seal said linking aperture only during a last portion of spring-induced travel whereby during the final spring-induced travel only the pressure of said first part of said compressed air volume will change, said chamber being arranged at the spring suspended part of the vehicle, said actuating means including a spring means for normally biasing said valve device into said linking aperture, solenoid means for normally opposing the action of said spring means when in the inactive state, electric circuit means including a switching means for activating said solenoid upon activation of said switching means, and abutment means arranged at the axle system in such manner as to activate said switching means within said last traveled portion of the spring-induced travel and thereby cause the shut-off means to move into closed position.

3. A spring system according to claim 2, wherein the valve device and the solenoid are arranged coaxially to said resiliently workable hollow piece, and said switching means are arranged inside the hollow piece.

(References on following page)

References Cited by the Examiner

UNITED STATES PATENTS

| | | | |
|---|---|---|---|
| 1,648,908 | 11/1927 | Mercier | 267—65 |
| 1,650,680 | 11/1927 | Youse | 267—65 |
| 2,115,158 | 4/1938 | Dupuy et al. | 267—65 |
| 2,898,103 | 8/1959 | Boulet | 267—65 |
| 2,901,241 | 8/1959 | Lautzenhiser et al. | 267—65 |
| 2,930,607 | 3/1960 | Hutzenlaub et al. | 267—65 |
| 2,956,797 | 10/1960 | Polhemus | 267—65 |

FOREIGN PATENTS

| | | |
|---|---|---|
| 617,565 | 2/1959 | Great Britain. |
| 875,512 | 8/1961 | Great Britain. |

ARTHUR L. LA POINT, *Primary Examiner.*